United States Patent [19]

Yamamoto

[11] Patent Number: 5,103,344
[45] Date of Patent: Apr. 7, 1992

[54] OPTICAL PICKUP
[75] Inventor: Seiichiro Yamamoto, Hachioji, Japan
[73] Assignee: Konica Corporation, Tokyo, Japan
[21] Appl. No.: 612,807
[22] Filed: Nov. 9, 1990
[30] Foreign Application Priority Data Nov. 22, 1989 [JP] Japan .................. 1-305047

[51] Int. Cl.[5] ............................. G02B 7/02
[52] U.S. Cl. ...................... 359/813; 359/823; 369/44.16; 369/256
[58] Field of Search .............. 350/252, 247, 255; 369/44.15, 44.16, 256

[56] References Cited
U.S. PATENT DOCUMENTS 4,878,214 10/1989 Hinotani .................. 369/256

Primary Examiner—Loha Ben
Attorney, Agent, or Firm—Frishauf, Holtz, Goodman & Woodward

[57] ABSTRACT

An optical pickup, wherein tracking coils are bonded to respective opposite corner parts of two square-tube-shaped focusing coils symmetrically with respect to the optical axis of a lens respectively so that the tracking coil is brought into contact with the two surfaces forming the corner part, at the corner part being apart from a lens holder, and that it is brought into contact with the surface forming the corner part and not being in contact with the lens holder, at the corner part being in contact with the lens holder to eliminate the occurrence of the torque around the axis perpendicular to the tracking direction and the focusing direction and thereby the transmission characteristic in the direction of tracks is improved. One side near to the lens holder of the tracking coil located at the corner part being apart from the lens holder is connected to the lens holder by coating the surface of the focusing coil with a bonding agent of lower hardness than a bonding agent used for bonding between the tracking coil and the focusing coil and between the focusing coil and the lens holder to improve the focusing performance.

1 Claim, 3 Drawing Sheets

OPTICAL PICKUP

BACKGROUND OF THE INVENTION

1. Field of the Invention

The present invention relates to an optical pickup which is employed for reading or writing information from or on an optical disk including a photomagnetic disk or for other purposes.

2. Description of the Prior Art

An optical pickup known heretofore has a structure wherein a lens holder is joined to a base conveyed in a substantially radial direction of an optical disk by a conveying means or to a member for fixation to the base through springs, and thereby is not only conveyed in the aforesaid direction of conveyance, but is also made displaceable elastically in the direction of the optical axis of a lens and substantially in the aforesaid direction of conveyance perpendicular to this direction, wherein two square-tube-shaped focusing coils are bonded to the lens holder in the direction of conveyance of the base with the lens holder held between, wherein tracking coils are bonded on two opposite surfaces of each focusing coil extending in the direction of conveyance of the base so that the respective central parts of the tracking coils are positioned substantially at the corner parts formed by the surfaces of the focusing coils being in contact with the lens holder and by the surfaces thereof extending in the direction of conveyance of the base, and wherein the center yoke part of a yoke fixed to the base is put in the tube of each focusing coil. When a current is made to flow through the tracking coils in the optical pickup of this structure, not only a force in the tracking direction, i.e. the direction of conveyance of the base, is applied to the lens holder by an electromagnetic force, but also a torque around an axis perpendicular to the tracking direction and the focusing direction is applied thereto due to the unbalance of the distribution of the intensity of a magnetic field in the direction of the optical axis of the lens, i.e. the focusing direction, which causes a problem that a transmission characteristic in the direction of tracks is deteriorated.

As an optical pickup solving the above-stated problem, the present inventor invented previously an optical pickup wherein bonding of the tracking coils to the focusing coils was made in the same way as usual with regard to one tracking coil symmetric with respect to the optical axis of the lens, out of two tracking coils of both focusing coils, while the bonding was made, regarding the other tracking coil, in such a manner that the position thereof was shifted to a corner part spaced apart from the lens holder facing the corner part of the focusing coil to which the one tracking coil is bonded, so that it came in substantially equal contact with two surfaces of the focusing coil forming the corner part.

The result of repeated further considerations and examinations of the optical pickup of the abovedescribed prior solution has revealed that there is such a relation as shown in FIG. 4 between a frequency f of the current flowing through the focusing coils and an amplitude dB of the lens holder and that a peak A appearing on the high frequency side of several kilohertz or above has a strong adverse effect on the focusing performance of the optical pickup.

SUMMARY OF THE INVENTION

The present invention has been made to solve this problem and it is aimed to furnish an optical pickup which is designed not only to improve the transmission characteristic in the tracking direction, but also to diminish the peak appearing on the high-frequency side of several kilohertz or above so that focusing can be conducted excellently.

A peak B on the low-frequency side in FIG. 4 is caused mainly by springs provided between the base and the lens holder and it can be varied by changing the springs, in such a manner that it becomes high when simple leaf springs are used and becomes low when springs of multilayer structure are used so that friction resistance can be applied.

As the result of their repeated considerations and examinations on settlement of the above-stated problem, the present inventor has found out that the peak A in FIG. 4 can be lowered to be almost inconspicuous with a focusing performance improved by a method wherein a side near to the lens holder of the tracking coil located at the corner part of the focusing coil which is apart from the lens holder is joined to the lens holder by coating the surface of the focusing coil with a bonding agent having a lower hardness than the bonding agent used between the tracking coil and the focusing coil and between the focusing coil and the lens holder.

The present invention is based on this finding. In the optical pickup of the present invention, the lens holder is joined to the base conveyed in the substantially radial direction of an optical disk by a conveying means or to a member for fixation to the base through springs, and thereby is not only conveyed in the aforesaid direction of conveyance, but is also made displaceable elastically in the direction of the optical axis of a lens and substantially in the aforesaid direction of conveyance perpendicular to this direction, wherein the two square-tube-shaped focusing, coils are arranged at both sides of the lens holder in the direction of conveyance of the base and are bonded to the lens holder, and wherein the tracking coils are bonded to the respective opposite corner parts of the two focusing coils symmetrically with respect to the optical axis of the lens, respectively, so that the tracking coil located at the corner part being apart from the lens holder is brought into contact with two surfaces forming the corner part and that the tracking coil located at the corner part being in contact with the lens holder is brought into contact with a surface forming the corner part and not being in contact with the lens holder, so that the side near to the lens holder of the tracking coil located at the corner part being apart from the aforesaid lens holder is joined to the lens holder by a bonding agent which has a lower hardness than the bonding agent used for the above-mentioned bonding and is applied on the surface of the focusing coil. The above-stated object is attained by this construction.

In the optical pickup of the present invention, in other words, the occurrence of the torque around the axis perpendicular to the tracking direction and the focusing direction is eliminated and thereby the transmission characteristic in the direction of tracks is improved by the construction wherein the tracking coils are bonded to the respective opposite corner parts of the two square-tube-shaped focusing coils symmetrically with respect to the optical axis of the lens respectively so that the tracking coil is brought into contact with the two surfaces forming the corner part, at the corner part being apart from the lens holder, and that it is brought into contact with the surface forming the corner part and not being in contact with the lens holder, at the corner part being in contact with the lens holder, and further the peak A in FIG. 4 is diminished and thereby the focusing performance is improved by the construction wherein the side near to the lens holder of the tracking coil located at the corner part being apart from the lens holder is connected to the lens holder by coating the surface of the focusing coil with the bonding agent of lower hardness than the bonding agent used for bonding between the tracking coil and the focusing coil and between the focusing coil and the lens holder.

Other purposes and features of the present invention will become apparent from the following description of drawings.

DESCRIPTION OF THE PREFERRED EMBODIMENT

The present invention will be described hereunder by an example shown in FIGS. 1 to 3.

Figure 1:
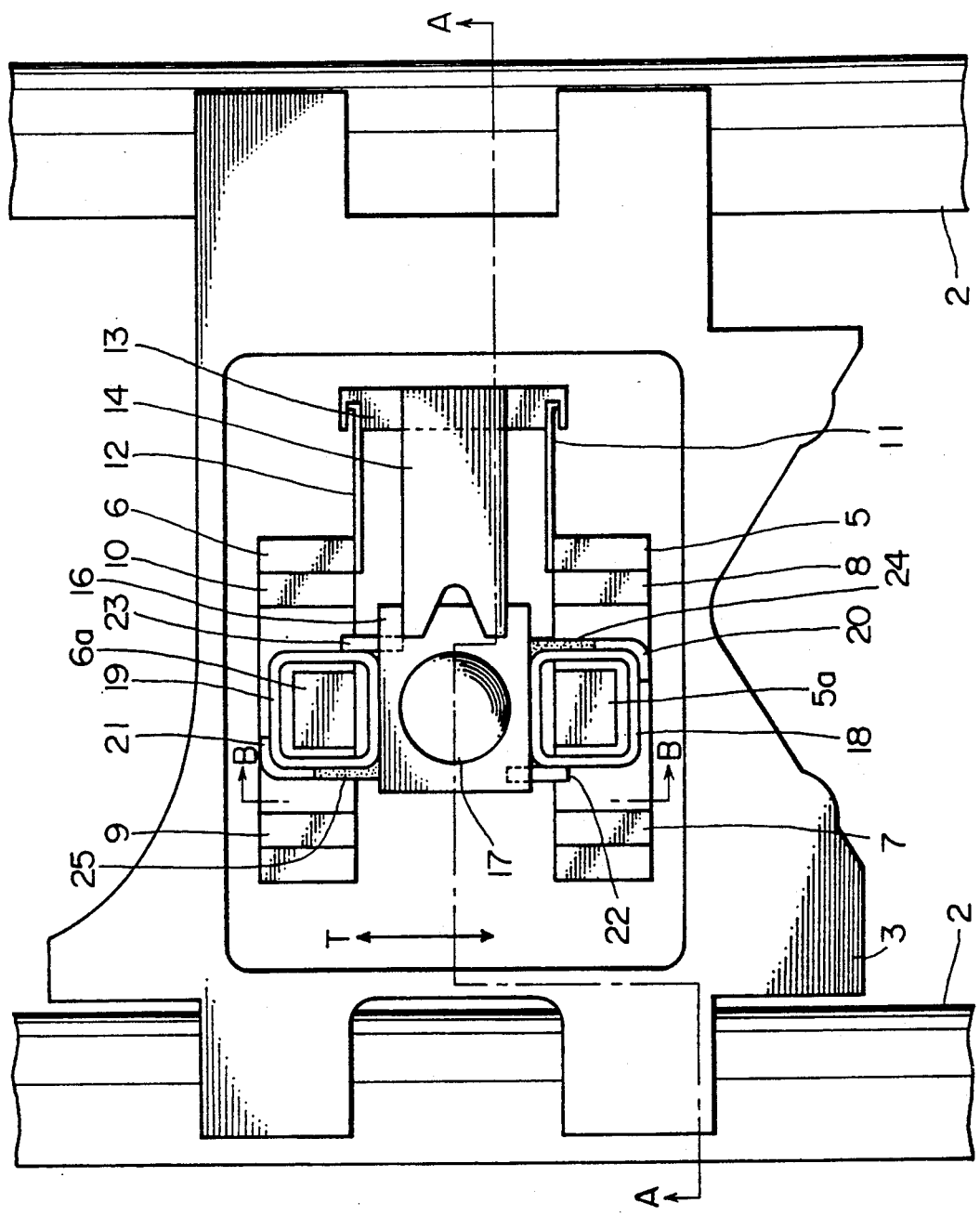
FIG. 1 is a plan view of an example of an optical pickup of the present invention.
Figure 2:
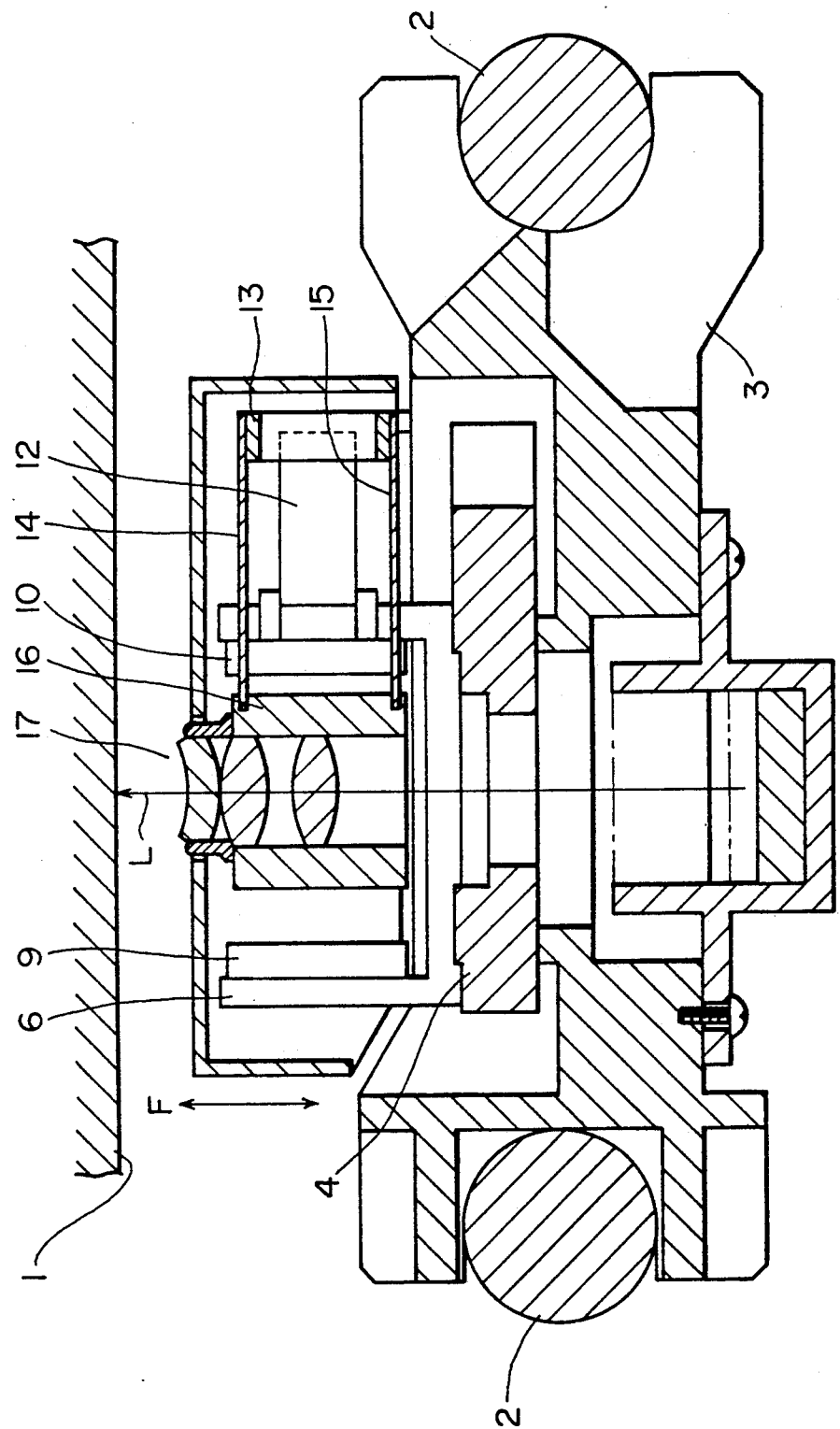
FIGS. 2 and 3 are views taken along lines A—A and B—B of FIG. 1 respectively.
Figure 3:
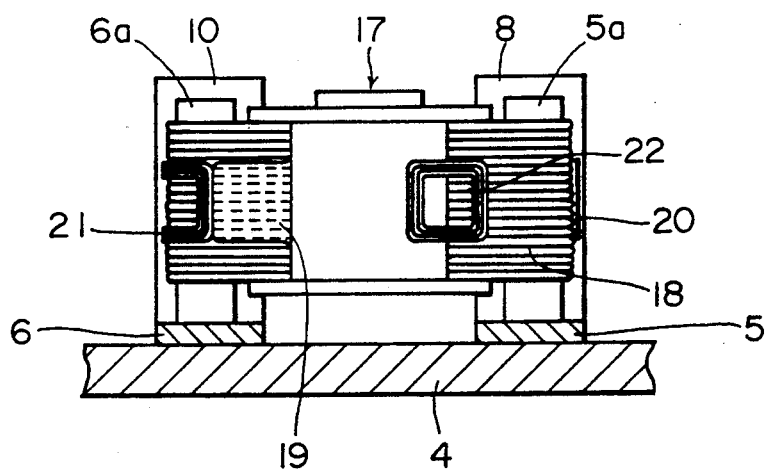

In FIGS. 1 to 3, numeral 1 denotes an optical disk, 2 guide bars, 3 a base conveyed in the substantially radial direction of the optical disk 1 under the guidance of the guide bars 2 by a conveying means not shown in the figures, 4 a sub-base formed in one body with the base 3; 5 and 6 E-shaped yokes fixed to the sub-base; 7, 8, 9 and 10 magnets fitted to the yokes 5 and 6; 11 and 12 leaf springs the base end parts of which are fitted to the yokes 5 and 6 and the fore end parts of which are connected to a junction member 13; 14 and 15 leaf springs the base end parts of which are fitted to the junction member 13 and the fore end parts of which are connected to a lens holder 16; and 17 an objective lens held by the lens holder 16.

By the above constitution, the lens holder 16 and, accordingly, the objective lens 17 are not only conveyed in the guiding direction of the guide bars 2, but are also made displaceable elastically in the direction of the optical axis of the lens, i.e. the focusing direction indicated by a double arrow F in FIG. 2, and in the direction perpendicular to this direction and substantially the same direction with the guiding direction of the guide bars 2, i.e. the tracking direction indicated by a double arrow T in FIG. 1, respectively.

Two square-tube-shaped focusing coils 18 and are 19 are arranged at both sides of the lens holder 16 in the tracking direction and fitted by a bonding agent to the lens holder 16, and the center yoke 5a and 6a of the E-shaped yokes 5 and 6 get into the tubes of the focusing coils 18 and 19, respectively. Tracking coils 20 and 21, and 22 and 23, are fitted to the respective opposite corner parts of the focusing coils 18 and 19 being symmetric with respect to the optical axis of the lens by a bonding agent, respectively. The tracking coils 20 and 21 are fitted to the corner parts being apart from the lens holder 16 so that they come into substantially equal contact with respective two surfaces of the focusing coils forming the corner parts, respectively, while the tracking coils 22 and 23 are fitted to the corner parts being in contact with the lens holder 16 so that each of them comes into substantially half contact with the surface not being in contact with the lens holder 16, out of the two surfaces of the focusing coil forming the corner part. These tracking coils 20 and 22, and 21 and 23, are positioned partially in a magnetic gap of a magnetic circuit formed by the yoke 5 and the magnets 7 and 8 and in a magnetic gap of a magnetic circuit formed by the yoke 6 and the magnets 9 and 10, respectively.

According to the above constitution, the lens holder 16 is subjected to an electromagnetic force in the direction of bending of the leaf springs 14 and 15 and displaced in the direction of the optical axis of the objective lens 17 by making a current flow through the focusing coils 18 and 19 and consequently focusing can be conducted, and also it is subjected to an electromagnetic force in the direction of bending of the leaf springs 11 and 12 and displaced in substantially the same direction with that of conveyance of the base 3 by making a current flow through the tracking coils 20 and 22, and 21 and 23, and consequently tracking can be conducted.

Figure 4:
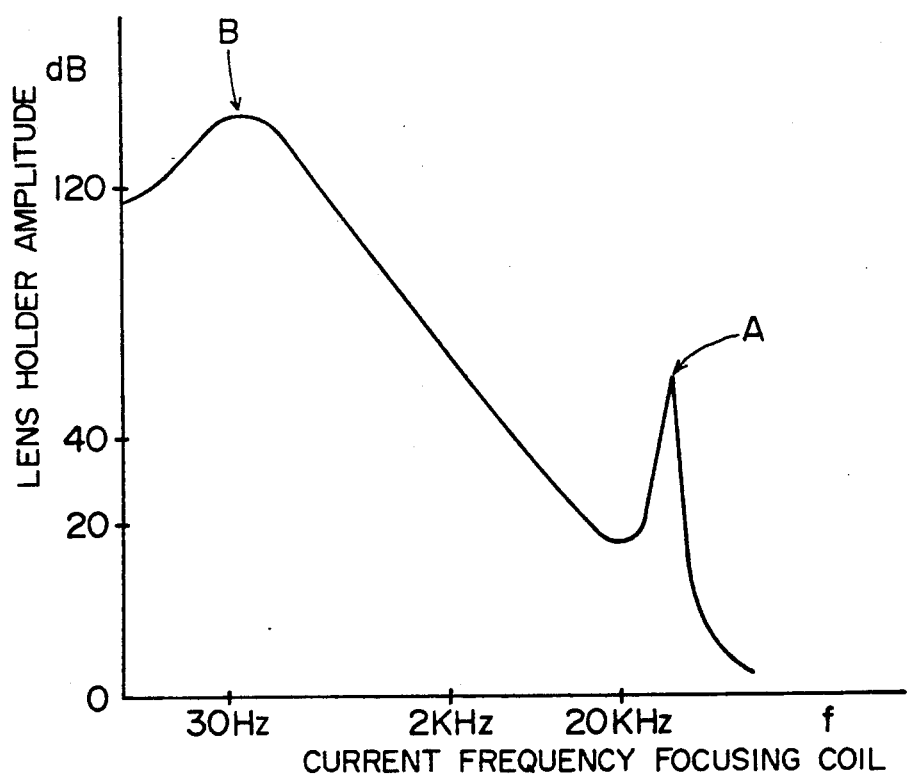
FIG. 4 is a graph showing a relation between the frequency of a current of a focusing coil and the amplitude of a lens holder.

The optical pickup having the above constitution is conveyed to an aimed track by the conveying means for conveying the base 3 and reading/writing information from or on the optical disk 1 is executed by a laser beam L shown in FIG. 2. The focusing on the occasion is conducted by a publicly-known focusing control circuit not shown in the figures which makes a current flow through the focusing coils 18 and 19, while the tracking is conducted by a publicly-known tracking control circuit not shown in the figures which makes the current flow through the tracking coils 20 and 22, and 21 and 23. The above-described constitution is the same with that of the optical pickup of the present inventor's prior solution wherein the transmission characteristic in the tracking direction is improved, and a satisfactory focusing performance can not be obtained thereby since the peak A in FIG. 4 appears.

In the optical pickup of the present invention, in this regard, the sides near to the lens holder 16 of the tracking coils 20 and 21 located at the corner parts being apart from the lens holder 16 are joined to the lens holder 16 by bonding agents 24 and 25 applied on the surfaces of the focusing coils 18 and 19, as shown in FIGS. 1 and 3. In the case when a bonding agent of phenol or epoxy is used for bonding the focusing coils 18 and 19 to the lens holder 16 and for bonding the tracking coils 20 and 22, and 21 and 23, to the focusing coils 18 and 19, a bonding agent of silicone rubber is used preferably for the bonding agents 24 and 25. However, the bonding agent to be used therefor is not limited thereto, and any bonding agent may be used on condition that it is of lower hardness than the bonding agent used for bonding between the lens holder and the focusing coils and between the focusing coils and the tracking coils. By this method, the peak A in FIG. 4 can be lowered to be inconspicuous and the focusing performance of the optical pickup is improved.

The optical pickup of the present invention has effects of being excellent in the transmission characteristic in the tracking direction and also being excellent in the focusing performance.

What is claimed is:

1. In an optical pickup wherein a lens holder is joined to a base conveyed in a substantially radial conveyance direction of an optical disk by a conveying means through springs, and thereby is not only conveyed in the direction of conveyance, but is also made displaceable elastically in the direction of an optical axis of a lens and substantially in the direction of conveyance perpendicular to the optical axis direction, wherein two square-tube-shaped focusing coils are arranged at both sides of said lens holder in the direction of conveyance of the base and bonded by a bonding agent to said lens holder, and wherein tracking coils are bonded to respective opposite corner parts of the two focusing coils symmetrically with respect to the optical axis of the lens, respectively, so that a tracking coil located at a corner part being apart from the lens holder is brought into contact with two surfaces forming the corner part and that another tracking coil located at another corner part being in contact with the lens holder is brought into contact with a surface forming said another corner parts and not being in contact with the lens holder, the improvement wherein:

a side near to the lens holder of the tracking coil located at the corner part being apart from the lens holder is joined to the lens holder by a bonding agent which has a lower hardness than the bonding agent used for the above-mentioned bonding and is applied on an outside surface of the focusing coil.

* * * * *